US012620784B2

(12) United States Patent
Rendulic

(10) Patent No.: US 12,620,784 B2
(45) Date of Patent: May 5, 2026

(54) KIT FOR AUTOMATED ASSEMBLING OR DISASSEMBLING OF LAMINATED ELECTRIC CIRCUITS

(71) Applicant: DUPLICO d.o.o., Kalinovica (HR)

(72) Inventor: Zeljko Rendulic, Zagreb (HR)

(73) Assignee: DUPLICO D.O.O., Kalinovica (HR)

( * ) Notice: Subject to any disclaimer, the term of this patent is extended or adjusted under 35 U.S.C. 154(b) by 26 days.

(21) Appl. No.: 18/130,428

(22) Filed: Apr. 4, 2023

(65) Prior Publication Data

US 2023/0238782 A1     Jul. 27, 2023

Related U.S. Application Data

(63) Continuation of application No. PCT/EP2021/065738, filed on Jun. 11, 2021.

(51) Int. Cl.
| | |
|---|---|
| *H02B 1/04* | (2006.01) |
| *H02B 1/056* | (2006.01) |
| *H02G 5/00* | (2006.01) |

(52) U.S. Cl.
CPC ............. *H02B 1/042* (2013.01); *H02B 1/056* (2013.01); *H02G 5/005* (2013.01)

(58) Field of Classification Search
CPC ........ H02B 1/042; H02B 1/056; H02B 1/207; H02G 5/005; H01H 73/08; H01H 71/08
See application file for complete search history.

(56) References Cited

U.S. PATENT DOCUMENTS

| | | | | |
|---|---|---|---|---|
| 4,358,633 A | * | 11/1982 | Reynolds, Jr. ......... | H02G 5/005 |
| | | | | 249/97 |
| 5,579,217 A | * | 11/1996 | Deam ..................... | H01L 23/52 |
| | | | | 257/E23.141 |
| 6,002,580 A | | 12/1999 | LeVantine et al. | |
| 8,366,457 B2 | | 2/2013 | Yamamoto et al. | |
| 9,735,524 B1 | * | 8/2017 | Rabl ..................... | H02M 7/003 |

(Continued)

FOREIGN PATENT DOCUMENTS

| | | |
|---|---|---|
| CN | 101237102 A | 8/2008 |
| EP | 1296431 A2 | 3/2003 |
| EP | 2724596 B1 | 10/2019 |

(Continued)

OTHER PUBLICATIONS

International Search Report and Written Opinion mailed on Feb. 18, 2022, received for PCT Application PCT/EP2021/065738, Filed on Jun. 11, 2021, 11 pages.

(Continued)

*Primary Examiner* — Robert J Hoffberg
(74) *Attorney, Agent, or Firm* — XSENSUS LLP

(57) ABSTRACT
A kit or system, which can be used for automated assembling and/or disassembling of laminated electric circuits can be comprised of insulating sheets, line conductors between insulating layers, which may have insulated spacers for structural straightening. Dedicated electric elements can be connected to the structure via the kit elements. The kit or system can comprise: jumpers, insert nuts, step bushings, bushings, threaded head screws or cylinder head screws, screw plugs, connecting screws, and sockets for integration $3^{rd}$ party elements to the laminated electric circuit.

9 Claims, 10 Drawing Sheets

(56)                    References Cited

U.S. PATENT DOCUMENTS

|  |  |  |  |  |
|---|---|---|---|---|
| 9,997,895 B2 * | 6/2018 | Mills | ...................... | H02B 1/056 |
| 2008/0024959 A1 | 1/2008 | Keegan et al. | | |

FOREIGN PATENT DOCUMENTS

| | | | |
|---|---|---|---|
| JP | S53-148192 | U | 11/1978 |
| JP | H06-038164 | U | 5/1994 |
| JP | 3550970 | B2 | 8/2004 |
| JP | 2012-95472 | A | 5/2012 |
| JP | 2015-222614 | A | 12/2015 |
| JP | 2017-084740 | A | 5/2017 |
| WO | 96/15577 | A1 | 5/1996 |
| WO | 2018/114687 | A1 | 6/2018 |

OTHER PUBLICATIONS

Office Action issued on Mar. 19, 2024, in corresponding Japanese patent Application No. 2023-515133, 6 pages.
Notice of Allowance issued on Jul. 16, 2024, in corresponding Japanese patent Application No. 2023-515133, 5 pages.

* cited by examiner

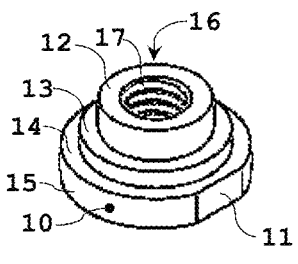
Figure 11A
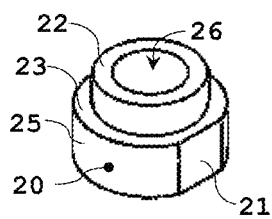
Figure 11B
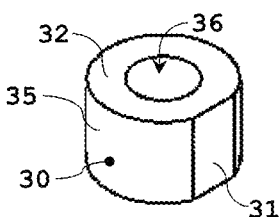
Figure 11C
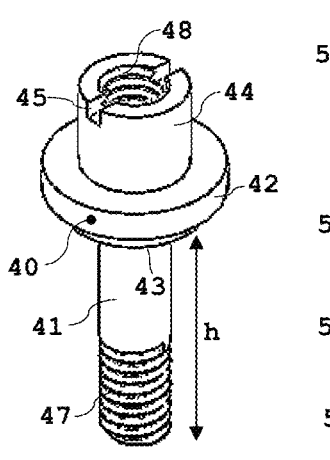
Figure 12A
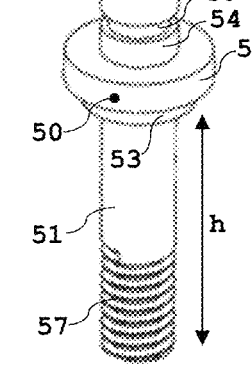
Figure 12B
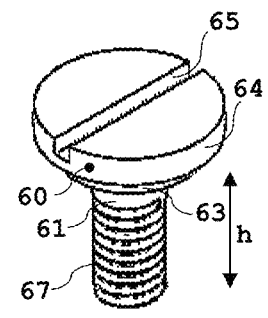
Figure 12C
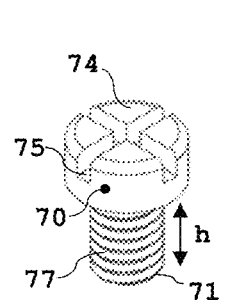
Figure 12D
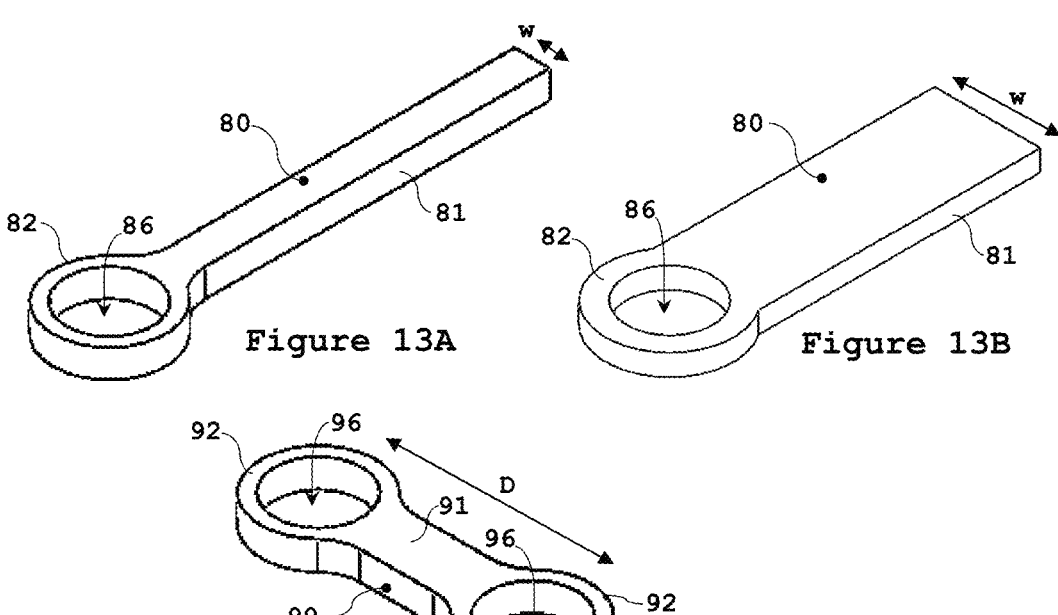
Figure 13A
Figure 13B
Figure 14

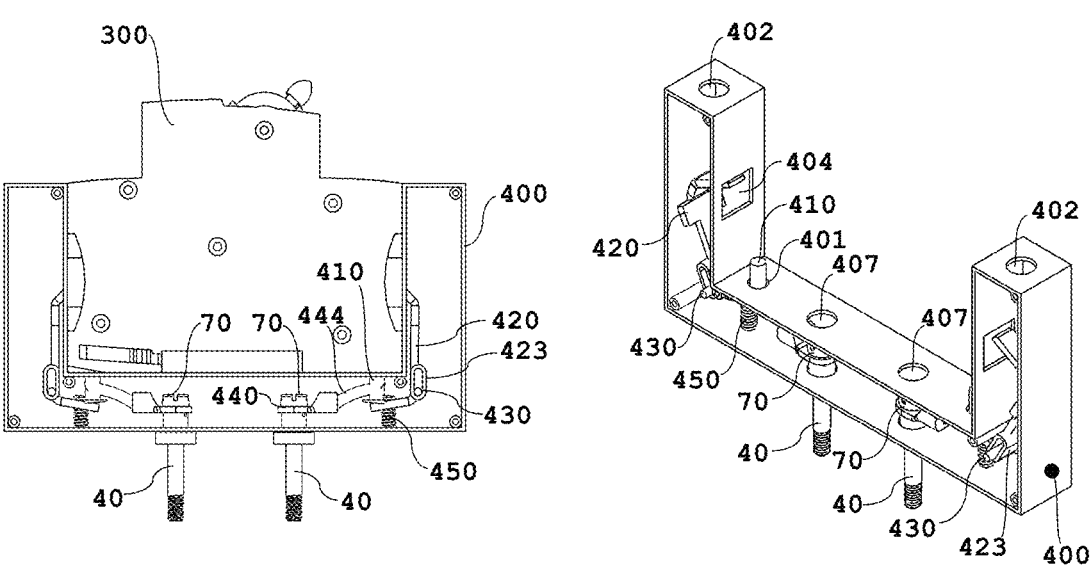
Figure 21
Figure 22
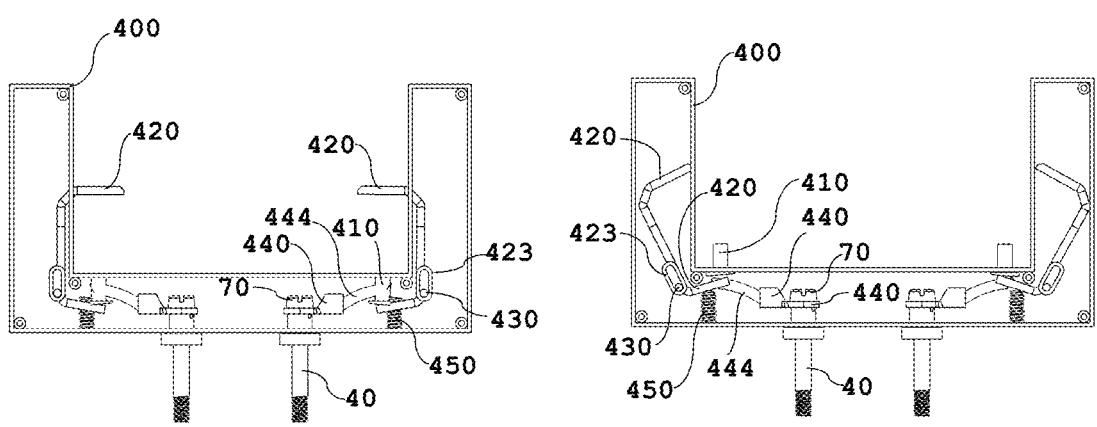
Figure 23
Figure 24

KIT FOR AUTOMATED ASSEMBLING OR DISASSEMBLING OF LAMINATED ELECTRIC CIRCUITS

CROSS-REFERENCE TO RELATED APPLICATION(S)

The present application is a continuation of International App. No. PCT/EP2021/065738 filed Jun. 11, 2021, wherein the entire content and disclosure of which is hereby incorporated by reference in its entirety.

TECHNICAL FIELD

The present disclosure relates to a kit or system and methods thereof that may be implemented for automated assembling and/or disassembling of laminated electric circuits.

Technical Problem

Distribution boards, used in electric cabinets, are known in the art. Such boards, with corresponding wirings, may be installed for electrical power distribution and electric circuit protection, equipped with circuit breakers, fault current circuit breakers and similar electric elements.

A technical problem observed in producing such distribution boards can be that the assembly process can still require substantial manpower which may be difficult to be automatised. In practice, such distribution boards may contain top-up profile mounting rails on the back of the housing, onto which the switching devices can be snapped. The switching devices can be connected one to another phase-by-phase via suitable electrical conductors, i.e., busbars, where one busbar can be used for each single-phase device. So-called busbar blocks can be being used for polyphase applications. The housing of the electric cabinets therefore can comprise a number of cable ducts and a plurality of conductors inserted into the cable ducts, with connecting lugs being provided on the mentioned conductors. The conductors can be inserted into connecting terminals on the switching devices and can be clamped firmly with it. A relatively large number of conductors and the corresponding contacts can produce a complex mesh which can be tracked, assembled, and disassembled by using substantial manpower and due care of the personnel included in the wiring process.

STATE OF THE ART

The European patent published as EP 2724596 B1 for BUS APPARATUS FOR USE WITH CIRCUIT INTERRUPTERS OR OTHER DEVICES and filed in the name of Labinal LLC [US], describes laminated electric circuits formation, the way insulating layers and plate-like line conductors are formed and interconnected, and the way the number of circuit interrupters and other electric elements are connected thereto. The system as presented in '596 document may be regarded as not being versatile, as any changes may be difficult if not impossible to be performed. The '596 solution seems to be silent regarding the non-standard elements usage, i.e., 3rd party elements used with it.

The European patent application published as EP 1296431 A2 for BUS BAR ASSEMBLY and filed in the name of ABB Patent GmbH [DE], describes connection of outer elements, such as input lines, to already prepared laminated electric circuits—busbars. This patent application describes a way the desired contact point is achieved at depth of the laminated busbar, via the conductor equipped with elastic member that fits the desired hole around the contact point. In addition, the plug which connects two conductive layers of the said laminated busbar is also disclosed.

The Japanese patent application published as JP 2012095472 A for POWER CONVERSION DEVICE and filed in the name of Mitsubishi Electric Corporation [JP] and Toshiba Mitsubishi Elec. Inc. [JP], describes a screw connection used to electrically connect the electric elements of the power converter with the laminated electric circuit.

The Japanese patent published as JP 3550970 B2 for POWER CONVERTER, AND MULTILAYER CONDUCTOR AND ELECTRIC COMPONENT CONNECTOR and filed in the name of Hitachi Ltd. [JP], describes a screw connection used to electrically connect the electric elements of the power converter with the laminated electric circuit.

Both JP '472 and JP '970, describe a permanent screw connection of the elements to the laminated board, which does not address problems of interconnections among the laminated electric circuits layers and automated assembly/disassembly issues.

The U.S. patent published as U.S. Pat. No. 6,002,580 for CIRCUIT BREAKER POWER DISTRIBUTION PANEL and filed in the name of Power Distribution Products Inc. [US], describes circuit breakers or similar elements removable connection with the laminated electric circuit situated within the power distribution panel. The solution cited in '580 remains silent regarding the problems of interconnections among the laminated electric circuits layers and automated assembly/disassembly issues.

The U.S. patent published as U.S. Pat. No. 8,366,457 for WIRING STRUCTURE AND JOINT BOX INCLUDING THE SAME and filed in the name Mitsubishi Cable Industry Ltd. [JP], describes specific pin geometry used for establishing electrical connections with the desired conductive parts and within the laminated structure which forms a circuit board.

The Chinese patent application published as CN101237102A for CASCADED POWER BUS BAR USED FOR MAGNETIC SUSPENDING TRAIN and filed in the name of University Jiaotong Southwest [CN], describes a high current laminated busbar with contacts formed for conducting layer accession.

The European patent application published as EP3555980A1 for METHOD OF MANUFACTURING A MULTI-PHASE BUSBAR AND ARRANGEMENT FOR ARRANGEMENT FOR CARRYING OUT THE METHOD and filed in the name of ABB Schweiz AG [CH], describes laminated busbar structure formation that is permanent, and in this case additionally filled with the resin that renders such solution hard to be disassembled.

SUMMARY

An aspect of the present disclosure involves a kit or a system that can be used for automated assembling or disassembling of laminated electric circuits and the corresponding electric elements connected thereto. The laminated electric circuit can be based on two or more insulating sheets and a plurality of line conductors sandwiched between each of two adjacent insulating sheets. Optionally, a set of insulating spacers, with thickness close to (or the same as) the line conductors, can be situated on the same layer for fortifying the structure. The whole laminated electric circuit can be mechanically tightly fastened once being formed.

Each line conductor, from the same layer, can have at least one line which ends with the line connector equipped with the a contact bore for forming the electric contact with other kit elements. One or more electric elements, or optional 3$^{rd}$ party electric elements that are previously inserted in sockets, can be electrically and mechanically connected to the said laminated electric circuit. This can be performed in a way that their electric contacts are connected via the kit elements to the desired line conductors situated within the mentioned laminated electric circuit.

The disclosed kit or system can comprise one, some, or all of the elements listed below:

(i) Jumpers, where each jumper can have a jumper line of arbitrary width, equipped with two or more jumper connectors, for instance, where each jumper connector can be equipped with the contact bore for forming the electric contact with other kit elements distributed over the same layer.

(ii) Insert nuts, for receiving compatible kit's screws, where each insert nut can have a contact surface dimensioned to receive a line connector or a jumper connector.

(iii) Step bushings, where each step bushing can be dimensioned for receiving a line connector or a jumper connector with its contact surface, and that can be equipped with a bore for free screw passage.

(iv) Bushings, where each bushing can have a bore for free screw passage.

Insert nuts, step bushings, and bushings can be of the same height, for instance, when are used at the same layer. The kit elements have one or more rotation stoppers formed on their outer surfaces that nests in the corresponding insulating layer, which can prevent the kit elements from rotating.

(v) Threaded head screws, where each threaded head screw can have a thread formed in the head to receive a connecting screw by which an electric element or a socket can be fastened thereto.

(vi) Cylinder head screws, where each cylinder head screw can have a cylindrical head with the fastening groove for receiving a snap fastener of a desired electric element.

Each threaded head screw shank or cylinder head screw shank can have a thread for fastening the screw into the insert nut and with a length of the shank dimensioned to receive n, n≥1, bushings or step bushings between the nut and the head stopper.

(vii) Screw plugs, where each screw plug can have at least a partially threaded shank for fastening the screw plug into the insert nut. The corresponding shank can be dimensioned to receive n, n≥1, bushings or step bushings between the nut and the flat head of the screw plug.

(viii) Connecting screws, where each connecting screw can have at least a partially threaded shank for screwing the connecting screw into the threaded head screws.

(ix) Optionally, the kit or system can comprise one or more same or differently formed sockets. Each socket can be equipped with the electro-mechanical mechanism designed for easy inserting and ejecting a 3rd party electric element from it. Also, each socket can enable that inserted 3rd party electric element having a locked mechanical position and a good electric contact with the laminated electric circuit via threaded head screws designed to hold the socket and the electric element.

According or more embodiments of the present disclosure, the insert nut can form electric contact with the line connector or jumper connector in a way that its contact bore can have the geometry that matches the outer geometry of the threaded cylinder formed within the insert nut, and where the distance from the contact surface to the top of the nut can be dimensioned according to the line connector or the jumper connector thickness. Similarly, the step bushing can form electric contact with the line connector or the jumper connector in a way that its contact bore can have the geometry that matches the outer geometry of the cylinder formed within the step bushing, and where the distance from the contact surface to the top of the step bushing can be dimensioned according to the line connector or the jumper connector thickness. Optionally, all of the kit's or system's step bushings and normal bushings, e.g., contactless bushings, can have the same height, and where the corresponding contact er bore geometry can be chosen to be circular, for instance.

According to one or more embodiments of the present disclosure, each threaded head screw can be equipped with the drive formed on the top of the head that can have machined thread formed in the head. The drive can enable screwing and unscrewing of the threaded head screw into the insert nut. Each cylinder head screw can be equipped with the drive formed on the top of the head, where the drive can enable screwing and unscrewing of the cylinder head screw into the insert nut. Likewise, each screw plug can be equipped with the drive formed in the flat head, where the drive can enable screwing and unscrewing of the screw plug into the selected insert nut.

According to one or more embodiments of the present disclosure, the socket's casing can be dimensioned to receive a dedicated 3rd party electric element. The casing can have a set of holes distributed in pairs over it. Screw holes can enable the socket to be fastened, via the pair of connecting screws inserted through the screw holes, to the corresponding threaded head screws emerging from the laminated electric circuit. Assembly holes can enable on-top tool manipulation with the element inserting levers during the mounting/dismounting of the electric element within the socket. Contact ejecting holes can be regarded as holes through which the element inserting levers are ejected or retracted. Activating pin holes can be regarded as holes through which the activating pins protrude in the mechanical contact with the electric element.

According to one or more embodiments of the present disclosure, the electro-mechanical mechanism can be composed from the activating pins, element inserting levers, pins, contact parts, and springs. Inserting of the electric element into the socket can engage the activating pins which push springs towards the bottom of the socket and rotate the pair of element inserting levers, fixed via their pin receiving portions, over the corresponding pins. This action can cause the element inserting levers to protrude through ejecting holes and to enter the electric element contact holes to be fixed into with the electric element screws. The element inserting levers can be in the permanent electric contacts, via the elastic contacts, with their corresponding contact parts. The contact parts can be electrically connected to the threaded head screws and therefore with the laminated electric circuit as well.

According to one or more embodiments of the present disclosure, the kit or system elements (i)-(ix) can be used for automated or semi-automated assembling or disassembling of the laminated electric circuits. In yet another variant, automated assembling or disassembling of the laminated electric circuits can be performed via one or more industrial robots.

DESCRIPTION OF FIGURES

FIGS. 11A, 11B, and 11C depict an insert nut, a step bushing, and a standard bushing, respectively, according to one or more embodiments of the present disclosure.

FIGS. 12A, 12B, 12C, and 12D depict a threaded head screw, a cylindrical head screw, a screw plug, and a connecting screw, respectively, according to one or more embodiments of the present disclosure. Optionally, all of the screws can be formed of various heights (h) and widths (including some or all with the same height and/or width).

FIGS. 13A and 13B depict line conductors of various widths (w) together with the corresponding line connector compatible with the above cited kit or system elements, according to one or more embodiments of the present disclosure.

FIG. 14 shows a jumper which can be of various lengths (D) and widths (w), and which can be compatible with the above described kit or system elements, according to one or more embodiments of the present disclosure.

FIG. 21 shows a side view of the $3^{rd}$ party electric element inserted in the socket according to one or more embodiments of the present disclosure.

FIG. 22 shows a perspective view of the socket, according to one or more embodiments of the present disclosure, with the $3^{rd}$ party electric element ejected.

FIG. 23 depicts a socket mechanism side view when the $3^{rd}$ party electric element is inserted in it, as depicted in FIG. 21.

FIG. 24 depicts a socket mechanism side view when the $3^{rd}$ party electric element is not present within the socket, as depicted in FIG. 22.

DETAILED DESCRIPTION

Figure 1:
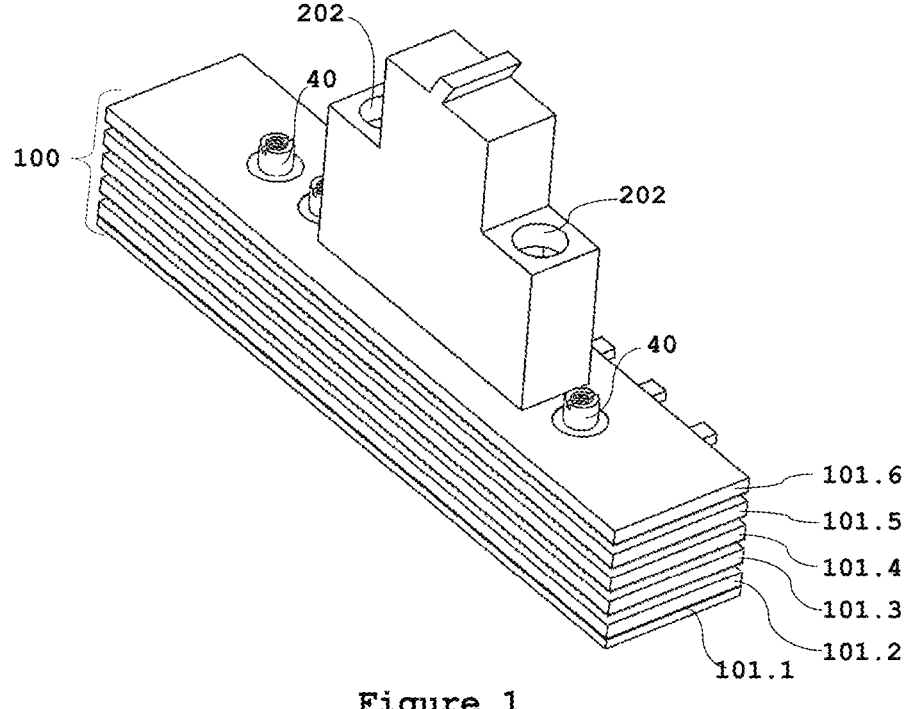
FIG. 1 depicts an electric element, a circuit breaker, connected to a laminated electric circuit, according to one or more embodiments of the present disclosure.
Figure 2:
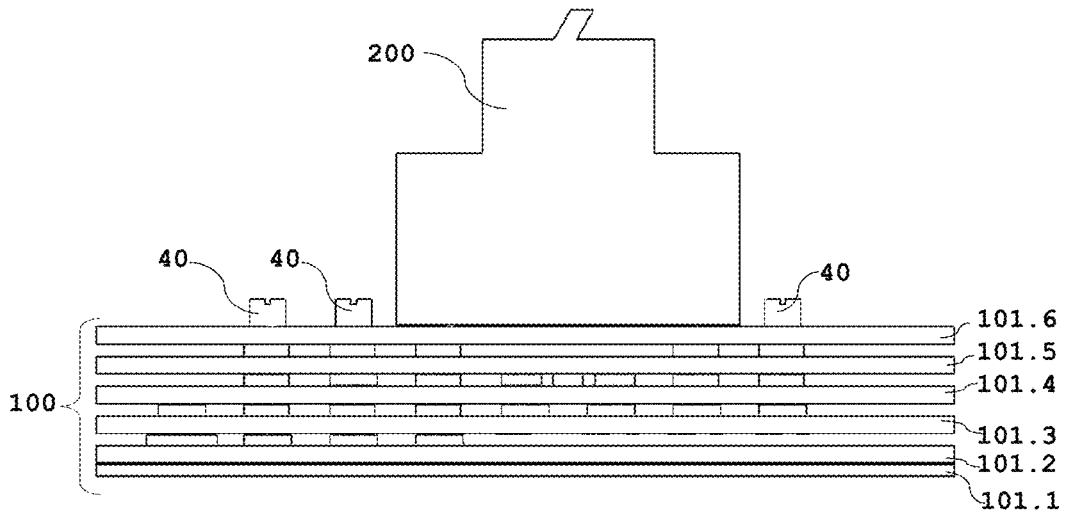
FIG. 2 depicts a side view of the situation shown via FIG. 1.

The present disclosure relates to a kit or system and methods thereof that can be implemented for automated assembling and/or disassembling of laminated electric circuits.

As an example, embodiments of the present disclosure can be oriented toward the installation of busbars and electric elements thereto. More particularly, embodiments of the present disclosure can relate to laminated busbars, in which a conductive material, i.e., the kit parts according to embodiments of the present disclosure, can be applied to the layered insulating supports in such a manner to form the desired conductive patterns within the layers of line conductors sandwiched within insulating supports.

Embodiments of the present disclosure can solve the above cited technical problem of standardisation, for instance, among one or more technical problems, by using a kit or system of elements together with prefabricated insulating sheets and plate-shaped (e.g., plate-like) line conductors which can form laminated electric circuits to which the electric elements can be fixed. The kit or system of elements can enable different layers to be electrically connected in a desired manner as well as the electric elements to be connected thereto. The kit or system parts can be designed in a way that a minimal set of elements can be used, and that the elements can be suitable for automated assembling and/or disassembling. In that way, a mesh of conductors, which may be relatively complex, can be replaced with the wiring that is analogue to predetermined multilayer printed circuits, with the provision that all mechanical contacts can be made by the kit or system elements connected one to another and/or further connected to the used line connectors and electric elements. Such solution can offer a wiring mesh that can be almost without connecting lugs, where used electric elements can be specifically designed to cooperate with the kit or system. In addition, the mentioned wiring types can offer a low contact resistance and suitable (e.g., excellent) temperature endurance of their contact points.

According to one or more embodiments of the present disclosure, third ($3^{rd}$) party electric elements can be connected to the above-described (closed) system of elements. This technical problem can be solved with one or more embodiments of the present disclosure by specific sockets designed to receive the $3^{rd}$ party electric elements, and to provide connecting interfaces with the laminated electric circuits. The sockets can be designed to allow automated assembling and/or disassembling to/from the laminated electric circuit. In addition, the sockets can allow corresponding $3^{rd}$ party electric elements to be inserted/ejected within the sockets in an automated way.

The automated assembling and/or disassembling process, as used hereby, can be regarded as a process where industrial robots are used without manpower. Semi-automated process can be regarded as a process where manpower is needed only for some limited number of operations.

Kit Elements

FIG. 11A depicts a insert nut (10). The insert nut (10) can be formed as a rotational body, with a rotation stopper (11) formed at a part of an outer cylindrical surface (15) which can be formed near the bottom of the nut (10). According to one or more embodiments, the rotation stopper (11), for instance, as shown in FIG. 11A, can be formed as a rectangle surface perpendicular to the base of the insert nut (10). In other variants, two, or even more surfaces can be machined on the cylindrical surfaces, for instance, in the form of hexagonal nut.

The nut (10) can further have a contact surface (13) and a stopping step (14). The stopping step (14) can allow the nut (10) to be nested in a desired insulating sheet (101.*i*) once being covered, for instance, in a way depicted in FIG. 3. Namely, the diameter of the bore formed in the corresponding covering insulating sheet (101.*i*) can be smaller than the stopping step (14) and the bore can have a diameter of the contact surface (13). So, the stopping step (14) can prevent the nut (10) from propagating through the covering insulating sheet (101.*i*) once the corresponding screws (40, 50, 60) are screwed into the nut (10).

In one variant, the nut (10) can be machined without the stopping (14), and the contact surface (13) can be spread up to the outer surface (15). In this variant, the diameter of the bore formed in the corresponding covering insulating sheet (101.*i*) can be equal to the diameter of the outer surface (15), for instance, machined in the way to match with one or more rotation stoppers (11). In this variant, the nut (10) may not be able to fasten different layers as in the variant above, but may allow easier machining of the insulating sheets (101.*i*) without steps within the bores made on insulating sheets (101.*i*).

Once the insert nut (10) is in a assembly process covered within the insulating sheet (101.*i*), the insert nut (10) can be locked in place via the stopping step (14), or via the other elements connected to the nut (10), as in variant where the stopping step (14) is absent.

One or more stoppers (11) can prevent any rotation of the nut (10) during the screwing of the screws (40, 50, 60). The contact surface (13) can be designed to establish a contact with the connectors (82, 92), which can be formed at the end of the lines (81, 91), i.e., at the end of line conductors (80) or jumpers (90). The contact surface (13) can be regarded as the step where connectors (82, 92), depicted on FIGS. 13A, 13B and 14, for instance, simply seat. Contact bores (86, 96)

can be designed to receive threaded cylinder (12), equipped with the inner thread (17) and into which compatible screws (40, 50, 60) can be screwed by inserting its threads into the hole (16). Screws according to embodiments of the present disclosure can be different from the screws (40, 50, 60), for instance, with different heights and/or with different diameters that can match the corresponding nut (10) inner diameter.

According to one or more embodiments, all outer nut's surfaces can be machined also as a polygonal shape. In that sense, even the connectors (82, 93) and the corresponding contact surface (13) can be machined as the polygons that match each other. According to one or more embodiments, the surfaces can have a circular geometry.

FIG. 11B depicts a step bushing (20) according to one or more embodiments. The step bushing (20) can be formed as the rotational body, with one or more rotation stoppers (21), formed at a part of outer cylindrical surface (25). As an example, a role of one or more stoppers (21) can be the same as in previously described inset nut (10) and can be equally machined. The step bushing (20) can have a contact surface (23). A role of the contact surface (23) may be identical to the role of the contact surface (13) formed on the nut (10). Contact bores (86, 96) can be designed to receive the hollow cylinder (22), which can be equipped with the bore (26) through which various screws (40, 50, 60) can pass without obstruction. According to one or more embodiments of the present disclosure, the outer step bushing's surfaces can be machined also in a polygonal shape, for instance, as well as corresponding the connectors (82, 92).

FIG. 11C depicts a bushing (30) according to one or more embodiments of the present disclosure. The bushing (30) can be formed as the rotational body (32), for instance, with one or more the rotation stoppers (31), formed at the cylindrical surface (35), with the previously described technical role. The bore (36), formed across the bushing (30), can be designed so that various screws (40, 50, 60) can pass through it without obstruction.

FIG. 12A depicts a threaded head screw (40) according to one or more embodiments of the present disclosure, for instance, with a shank (41) that can have a thread (47) compatible with the nuts (10), where the shank (41) may be of a height (h). In one variant, the screw (40) can have a stepped neck (43) that can connect the shank (41) and the head stopper (42). The head (44) can be formed as a cylindrical body over the head stopper (42), as an example configuration. The head (44) can have an inner thread (48), capable to receive a corresponding connecting screw (70), and a drive (45) for screwing the screw (40) into the nut (10).

FIG. 12B depicts a cylindrical head screw (50) with a shank (51) that can have a thread (57) compatible with the nuts (10), according to one or more embodiments of the present disclosure, where the shank (51) can be of a height (h). In one variant, the screw (50) can have a stepped neck (53) that can connect the shank (51) and the head stopper (52). The head (54) can be formed as a cylindrical body over the head stopper (52), as an example configuration. The head (54) can have a fastening grove (59), for instance, capable of interacting with a snap fastener (209) of a desired electric element (200), for instance, and with a drive (55) for screwing the screw (50) into the nut (10).

FIG. 12C depicts A plug screw (60) according to one or more embodiments of the present disclosure that can have a threaded shank (61) of a height (h), for instance, with a thread (67) for screwing into the insert nut (10), and where the shank (61) may have a height (h). In one variant, the screw (60) can have a stepped neck (63) that can connect the shank (61) and a flat head (64) equipped with a drive (65).

When the screws (40, 50, 60) are machined with stepped necks (43, 53, 63), the stepped necks can have the same technical role as the stopping step (14), machined on the nut (10), has. Namely, the stepped necks (43, 53, 63) can allow the screws (40, 50, 60) to fasten corresponding insulating sheet (101.*i*) with this stepped portion once the screws are screwed into the corresponding nuts (10), as depicted on FIGS. 3 and 4, for instance. If the screws (40, 50, 60) are machined without stepped necks (43, 53, 63), then the diameter of the bore formed in the corresponding covering insulating sheet (101.*i*) can be equal to the diameter of the used head stoppers (42, 52) or flat heads (64). In this variant, the screws (40, 50, 60) may not be able to fasten different layers as in the variant above—but can allow easier machining of the used insulating sheets (101.*i*).

FIG. 12D depicts a connecting screw (70) according to one or more embodiments of the present disclosure which can have a thread (77), made on a shank (71), which can fits the head thread (48) formed in the threaded head screw (40). The connecting screw (70) can have a head (74) and a corresponding drive (75) formed thereto.

FIG. 14 depicts a jumper (90) according to one or more embodiments of the present disclosure, for example, formed with two contact bores (96) at its connectors (92), where the connectors (92) can be connected with a jumper line (91) of having a length (D). The jumper (90) can be equipped with three or more connectors (92), according to one or more embodiments, for instance, distributed in the same line, or in any other geometry, such as zigzag. Jumper (90) thickness can depend on used kit elements and other technical needs, as examples.

FIGS. 13A and 13B depict various line conductors (80), i.e., of various width (w), and its end connectors (82) formed at the end of the corresponding lines (81), according to one or more embodiments of the present disclosure. Such endings, i.e., connectors (82) can form inputs/outputs for a mesh (80) of various topologies and schemes each within laminated layer. Each connector (82) can be equipped with the contact bore (86) that can fit over the hollow cylinders (12, 22) that can be formed on the nuts (10) and step bushing (20) respectively. The line conductors (80) and the corresponding elements (81, 82), according to one or more embodiments of the present disclosure, may not constitute the kit's or system's elements (10, 20, 30, 40, 50, 50, 70), with which they can be compatible.

One, some, or all of above kit's elements (e.g., 10, 20, 30, 40, 50, 60, 70, 90) and the corresponding line conductors (80) can be formed from metals having good electric and thermal properties, such as aluminium, copper, and their alloys. In one further variant, the nut (10) can be formed from an insulating material, for instance, having in mind that such choice can improve the insulating properties of whole insulating sheets where the nuts (10) are used.

Laminated Electric Circuits Formation

An example of the laminated electric circuits according to one or more embodiments of the present disclosure is depicted via FIGS. 1-5. Laminated electric circuits (100), used in electric cabinets, for instance, can be comprised of or consist of two or more insulating sheets (101.*i*), i=1, 2, . . . n. In general, the insulating sheets (101.*i*) can be of the same or different thickness. The number of insulating sheets (101.*i*) may depend on circuit complexity, number of phases used, etc. In general, insulating sheets (101.*i*) can be made of materials that may be used in manufacturing PCBs (Printed Circuit Boards) having good insulating properties.

In contrast to standard low current and low voltage PCBs, which may be manufactured with already deposited line conductors on in, for the electric cabinets according to one or more embodiments of the present disclosure a special line conductor (80) mesh can be designed and sandwiched between the insulating sheets (101.*i*, 101.*i*+1) (e.g., between adjacent insulating sheets). When line conductors (80) are not distributed uniformly over the insulating sheet (101.*i*), it may be desirable or necessary to distribute a set of insulating spacers, with thickness close to (including the same as) the line conductors (80), for instance, around the line conductors (80), to form laminated electric circuit layer more solid and compact. The thickness of the used line conductors (80) may depend on maximum current projected to flow across them, kind of used conductors, e.g., Cu or Al, and the heat dissipation requirements that may need to be satisfied.

In practice, the automated assembly can begin from an initial layer, i.e., insulating sheet (101.1) that can be dimensioned to surpass the dimensioning of all line conductors (80) mesh used. On that insulating sheet the bottom kit elements, such as insert nuts (10), can be placed. Then, a tailored insulating sheet (101.2), see, for example, FIGS. 4 and 5, with spaces designed for nesting the nuts (10) can be placed directly over the first insulating sheet (101.1). All insert nuts (10) can be equipped with the rotation stoppers (11) which can prevent the nuts to rotate once being embedded in the insulating sheet (101.2). Then the first layer of line conductors (80) can be deployed on the insulating sheet (101.2), optionally with the insulating spacers distributed around, if desired. Some of the line conductors (80) can be connected to the insert nuts (10). Then, the next tailored insulating sheet (101.3) can be deposited. The insulating sheet (101.3) can have, in one variant, bores and nests. Bores can be for receiving step bushings (20) or bushings (30), while the nests can be for receiving insert nuts (10). In this variant, where nuts (10) have stopping steps (14), the bores and nests may not be the same. The nests can prevent the insert nuts (10) to pass the insulating sheet (101.*i*) which can cover the nuts (10) once being nested into during the screwing the screws (40, 50, 60). In another variant, where the insert nuts (10) are formed without stopping steps (14), the bores and nests formed in the insulating sheet (101.*i*) can be equal. Each bore/nest can have a part for receiving rotation stoppers (11, 21, 31) to prevent in situ rotation of the corresponding elements (10, 20, 30).

Insulating films, formed from insulating paper or other materials, for instance, can be used in order to insulate various lines (81) one from another within the laminated structure (100) connection points, i.e, close to the corresponding bores (82), if desired. This insulation can be furnished advance to automatic, or semi-automatic assembly of the cited laminated structure.

Then again, the second layer of line conductors (80) can be deployed on the insulating sheet (101.3) where some of the line conductors (80) are connected to the insert nuts (10) or step bushings (20).

In the same way explained above, the structure can grow, new tailored insulating sheets (101.*i*, 101.*i*+1, . . . ) can be added as well as the corresponding line conductors (80) sandwiched among each two layers with optional use of the insulating spacers. When the desired laminated electric circuit is formed, it can be mechanically tightly fastened by a set of fasteners, for instance, by outer screws or elastic ribbons, capable to lock some or all layers together.

Kit's elements, which can be used for automated assembling or disassembling of laminated electric circuits, can be the focus of one or more embodiments of the present disclosure. The kit elements can be those which can solve further a technical problem that may be encountered in forming the laminated electric circuit via automated, or semi-automated, assembling or disassembling, including one or more of the following:

A. the way the corresponding line conductors (80), belonging to the same layer, are mutually connected, B. the way the corresponding line conductors (80) are connected mutually if belongs to different layers, C. the way the corresponding line conductors (80) are connected with the standard electric elements (200) directly mounted over the laminated electric circuit, and D. the way the corresponding line conductors (80) are connected with the sockets (400) mounted over the laminated electric circuit, capable to receive the $3^{rd}$ party electric elements.

In that sense it is instructive to look closer at examples in order to understand exemplary roles of the kit's elements.

A. The Same Layer Connection

Figure 7:
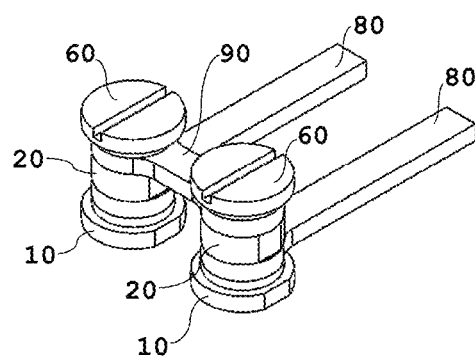
FIG. 7 shows two conducting line connections, where both lines can emerge from the same laminated electric circuit layer, connected via the corresponding jumper.
Figure 7A:
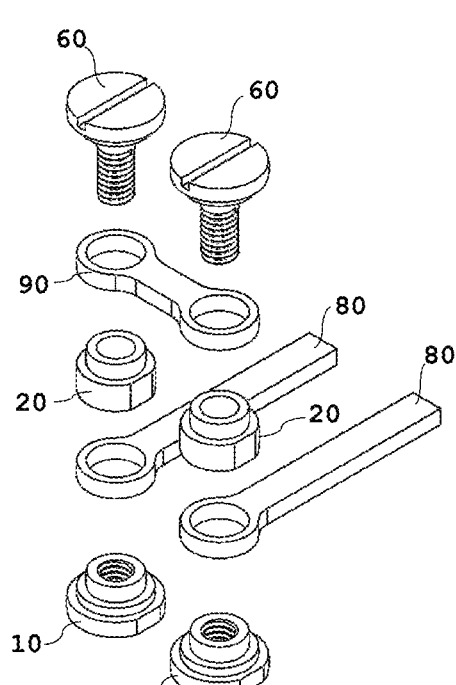
FIG. 7A shows all elements that may be used for the identical connection in the exploded view.

FIGS. 7 and 7A depict the situation where two line conductors (80) from the same layer are to be connected, where the layer is not a bottom layer, i.e., the insulating layer (101.2). This situation can be possible to observe in the central part of the FIG. 3. Two insert nuts (10), one close to another, can be nested within the insulating layer (101.3), which may have been previously tailored to receive/cover the set two nuts (10), together with other elements. Then the mesh of line conductors (80) can be deposed on the layer (101.3), where two line conductors (80) can have their connectors (82) equipped with the contact bores (86) that can fit the contact surfaces (13) formed on the insert nuts (10), FIG. 7. Then, other connections can be formed on the same layer where desired.

Subsequently, a new insulating layer (101.4) can be deployed. This layer (101.4) can be formed, inter alia, with bores for receiving step bushings (20) and the corresponding stoppers (21) in positions over (e.g., exactly over) the previously deposited insert nuts (10). Over the step bushings (20), the jumper (90) can be deposited in a way to sit with its contact bores (96) on the contact surfaces (23). Finally, the insulating layer (101.5) can be deployed, two plug screws (60), which can be protruding across the said insulating layer (101.5), the jumpers (90), the bushings (20), the line connectors (82) formed at the end of the line conductors (80), can be finally screwed into the nuts (10). In that way the same layer connection, among the line conductors (80), can be established. The screw stepped necks (63) can lock the screw plugs (60) into the nests previously prepared on the insulating layer (101.5), as visible in the FIG. 4, for instance.

Figure 3:
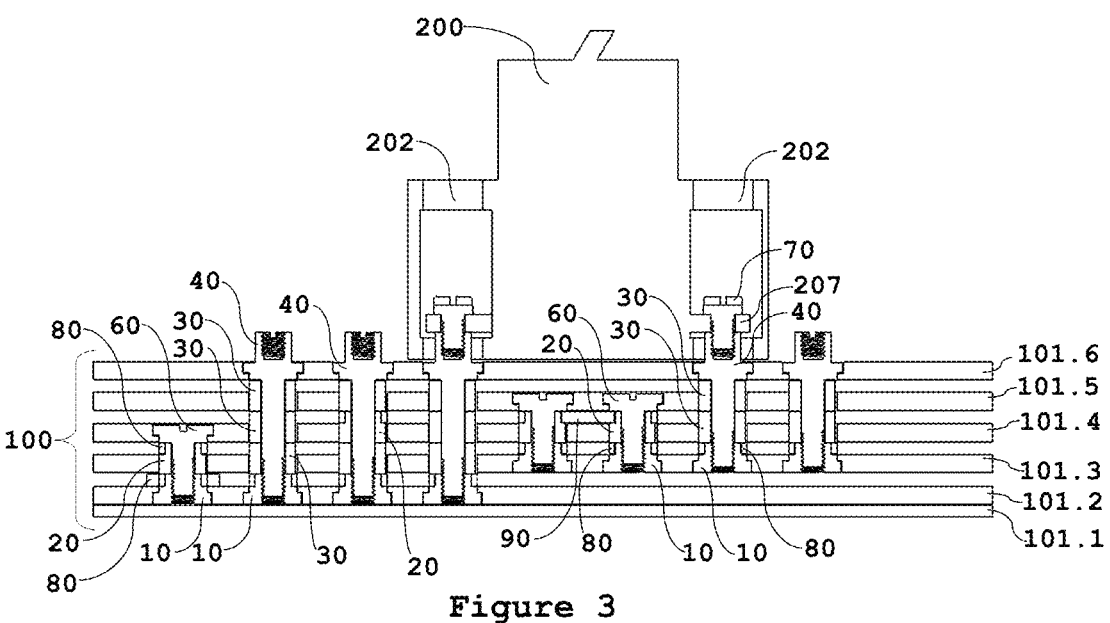
FIG. 3 shows an inner structure of the laminated electric circuit and the corresponding circuit breaker connected thereto, according to one or more embodiments of the present disclosure.
Figure 4:
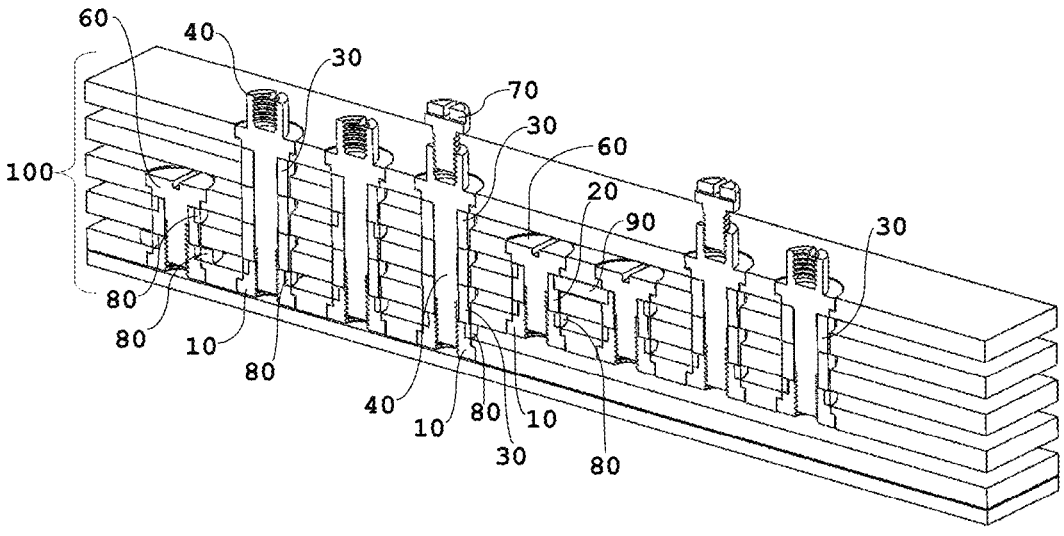
FIG. 4 shows the situation depicted via FIG. 3, but without the circuit breaker.
Figure 5:
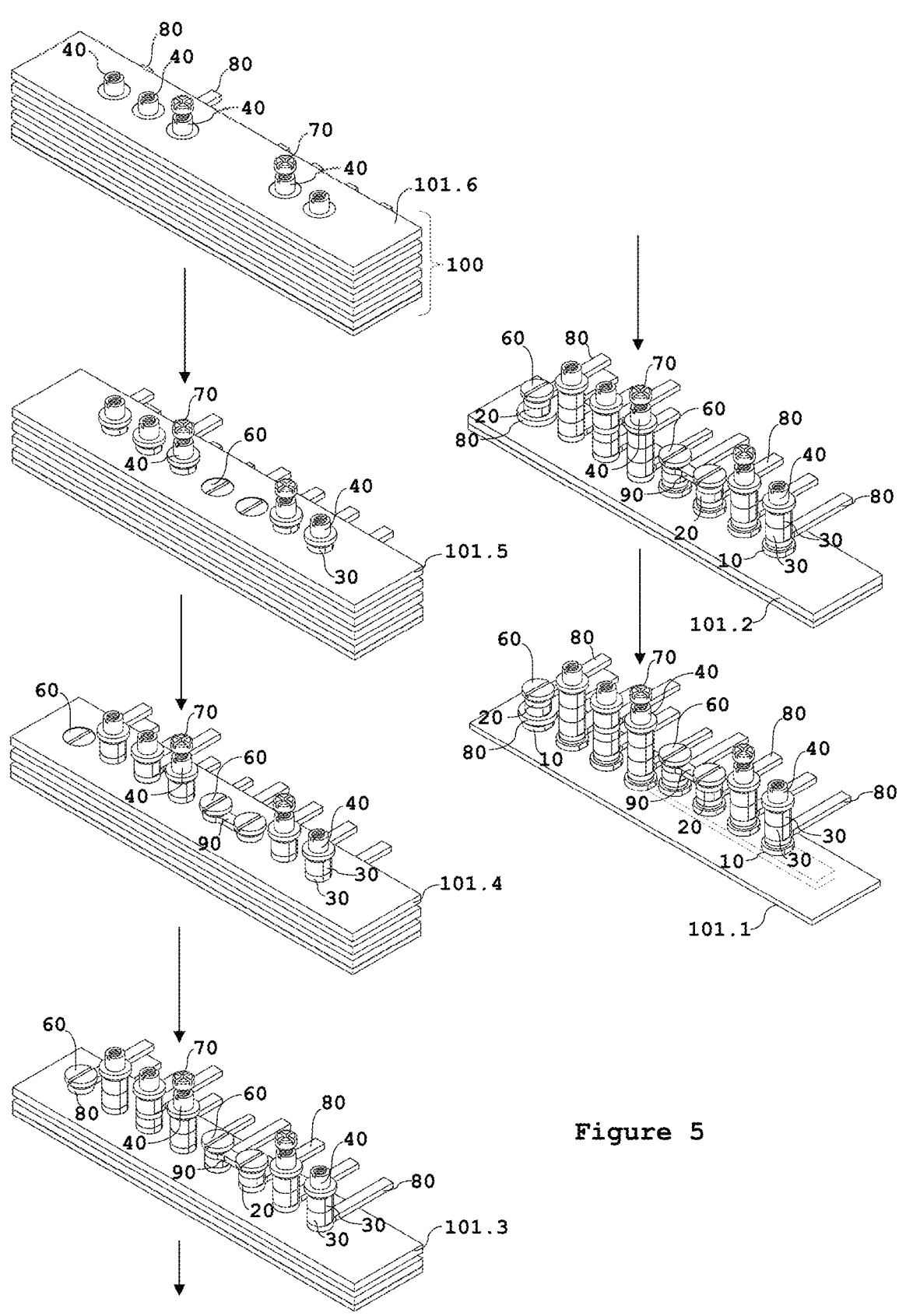
FIG. 5 reveals layer-by-layer striping of the laminated electric circuit to reveal the kit's or system's parts used and intralayer contact formation, according to one or more embodiments of the present disclosure.

Similarly, the other screws (40, 50, 60), i.e., their screw necks (43, 53, 63), can be capable to nest in the corresponding insulating layer. The screw (40, 50, 60), once screwed with the desired insert nut (10), can reinforces the laminated structure (100) by pressing the stopping step (14) of the corresponding nut (10) towards the screw neck (43, 53, 63), such as shown in FIGS. 3 and 4.

The above can be performed also by using nuts (10) in the variant without stopping step (14) and the screws (40, 50, 60) without the corresponding stepped necks (43, 53, 63). In this variant the outer fastening of the laminated structure (100) can be applied having in mind that inner reinforcements between stopping steps (14), layers/elements in between, and stepped necks (43, 53, 63) are absent.

B. A Different Layers Connection

Figure 6:
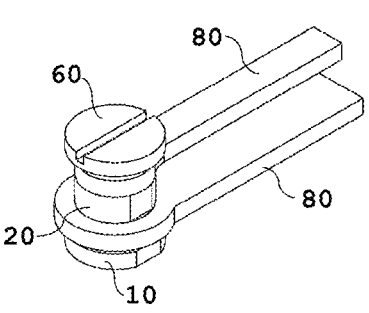
FIG. 6 shows two conducting line connections, where each line can emerge from different laminated electric circuit layer, connected via the step bushing, the screw plug, and the insert nut.
Figure 6A:
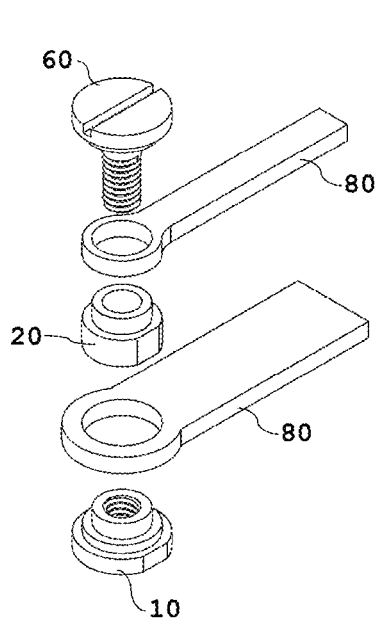
FIG. 6A shows elements that may be used for the identical connection in the exploded view.

FIGS. 6 and 6A depict the situation where two line conductors (80) from different layers are to be connected. The same situation is depicted on FIG. 4, outmost left position within the laminated structure (100). Layer formation can be the same as explained in the case A. above; again the insert nut (10) can be nested in the insulating layer (101.2) and the corresponding line conductor (80) mesh can be deployed thereto. A wider line conductor (80) with its line connector (82) can be put on the contact surface (13) formed on the insert nut (10). Then, other connections can be formed on the same layer where desired. Then, a new tailored insulating layer (101.3) can be deployed, and the bushing (20) can be positioned over the line connector (82) in the bore already formed in the insulating layer (101.3). Subsequently, a new corresponding line conductor (80) mesh can be deployed thereto, where one of its line connectors (82) can be put on the contact surface (23) formed on the step bushing (20). Then, the new layer (101.4) can be deployed with tailored nest for receiving the screw (60). Then, the screw (60) can be protruding from the layer (101.4), the upper line connector (82), the bushings (20) situated within the layer (101.3), the bottom placed line connectors (82), and can be screwed into the nut (10) nested within the layer (101.2).

The above can be performed also by using nuts (10) in the variant without stopping step (14) and the screws (40, 50, 60) without the corresponding stepped necks (43, 53, 63).

The systems described in A. and B. can be used universally. The set of the jumpers (90) can be identical, however, jumpers of different lengths (D) and widths (w), for instance, as shown in FIG. 14, can be used. Furthermore, stacking more bushings (20) can allow that three or even four different layers connections can be established, i.e., connections between line conductors (80) deployed on three or more layers.

C. Dedicated Electric Elements Connections

Figures 10, 10A:
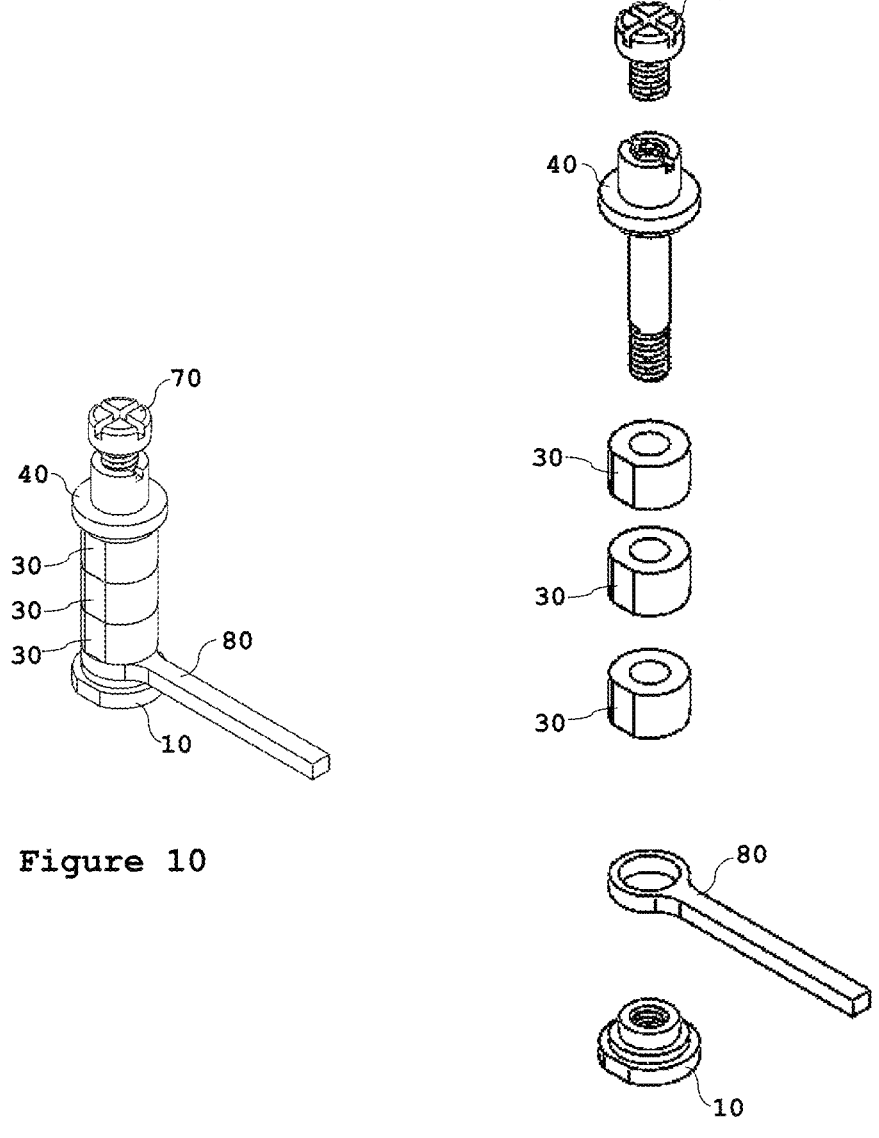
FIG. 10 shows how outer electric element can be connected to some desired conducting line connection situated at the bottom of the laminated electric circuit, i.e., close to the insert nut, according to one or more embodiments of the present disclosure. The connection can be performed by the threaded head screw and a plurality of bushings at each laminated layer.
FIG. 10A shows elements that may be used for the identical connection in the exploded view.

FIGS. 1 and 3 depict an example of one variant where the dedicated electric element (200) can be connected to the laminated structure (100), once formed. Firstly, the electric element (200), such as a circuit breaker, can be designed to cooperate with the disclosed kit or system. So, each electric element (200) can have two or more electric contacts (207), for instance, situated in a way that these contacts can be accessible via the screw holes (202) formed above the electric contacts (207). The mentioned screw holes (202) can enable the specifically designed connecting screws (70) to be inserted through the holes (202)) and to fasten the electric contacts (207) to the threaded head screws (40) designed for this purpose. The thread (77), machined on the connecting screw shank (71) can cooperate with the thread (47) machined in the head (44) of the threaded head screw (e.g., 40). Basically, screw connection of the connecting screw (70) and the threaded head screw (40) can assure good electrical and mechanical connection that can be relatively simply assembled and disassembled, just by screwing, for instance, as depicted on the FIG. 10 or FIG. 10A.

Figure 8:
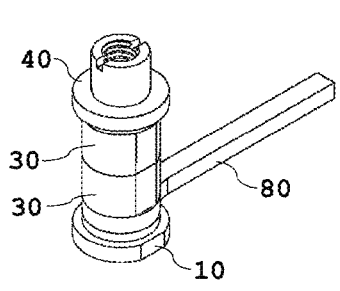
FIG. 8 shows how outer electric elements can be connected to the desired conducting line connection, situated at some laminated electric circuit layer, where the connection can be performed by the threaded head screw and several bushings used, according to one or more embodiments of the present disclosure.
Figure 9:
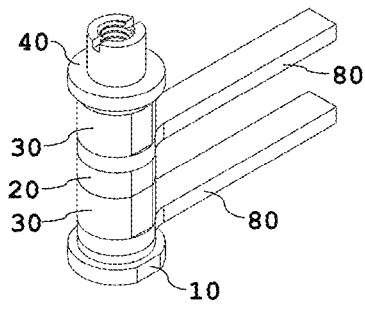
FIG. 9 shows how outer electric element can be connected to two conducting line conductors, where each conducting line can be situated at the different laminated electric circuit layer, where the connection can be performed by the threaded head screw and several bushings used, according to one or more embodiments of the present disclosure.
Figure 8A:
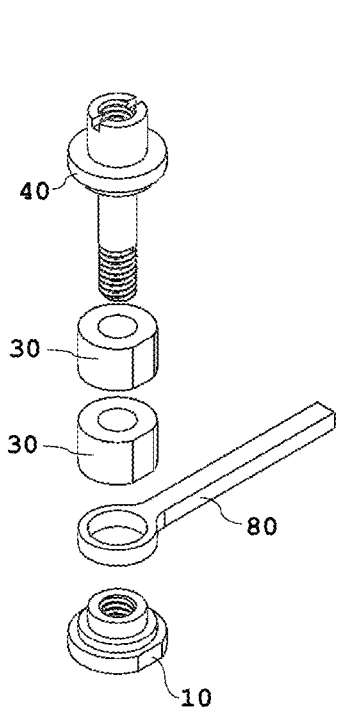
FIG. 8A shows elements that may be used for the identical connection in the exploded view.
Figure 9A:
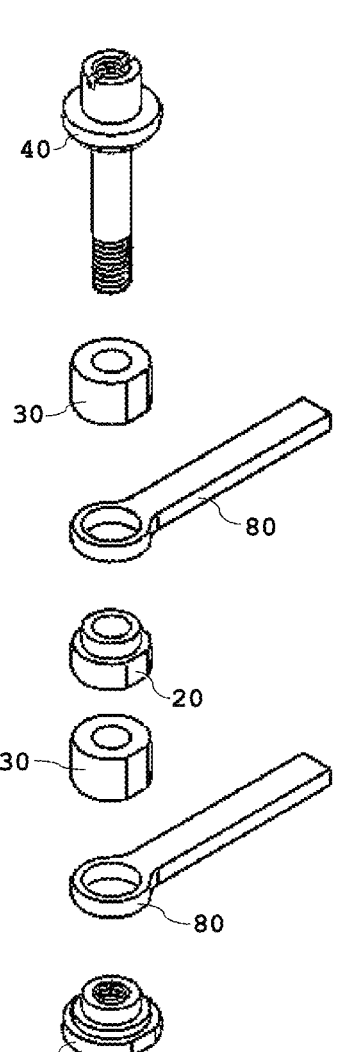
FIG. 9A shows elements that may be used for the identical connection in the exploded view.

Another aspect can be the way a threaded head screw (40) can interact with one or more line conductors (80) disposed on one on more insulating layers (101.$i$). The example depicted in FIG. 8 shows the threaded head screw (40) connected to only one line conductor (80) situated three layers below the top surface of the laminated electric circuit (100), to which some electric element (200) can be attached. The exploded view of the same structure is depicted via FIG. 8A. The layers formation is already explained in A. and B. sections above, as well as the fastening of the screws to nuts in one or more variants with or without stopping surfaces (14) and stepping necks (43, 53, 63). Here, the line conductor (80) can be attached to the insert nut (10) situated at the insulating layer (101.3), outmost right position, as depicted in FIG. 3, as an example. Two bushings (30), positioned over the nut (10), can be used one over another, one at the insulating layer (101.4) and another at the insulating layer (101.5). Similarly, the case with two line conductors (80) is depicted in FIGS. 9 and 9A. In that example, information regarding the step bushing (20) and the line conductor (80), as learned form A. and B. above, for instance, can be exploited herby to add an extra line conductor (80) connection with the structure which is tighten via threaded head screws (40) to the bottom insert nut (10).

Each threaded head screw shank (41) can have the thread for fastening into the insert nut (10) and the thread head screw shank (41) can have a length, for instance, dimensioned to receive n, n≥1, bushings (20, 30) between the nut (10) and the head stopper (42). So, one or more different threaded head screws (40), which may differ only in its height (h), can be used. It that sense, it may be instructive to compare threaded head screws (40) depicted in FIG. 8A where two bushings (30) are used, to one depicted in FIG. 10A where three bushings (30) are used between the corresponding head stopper (42) and the used nut (10).

Figures 15, 16, 17:
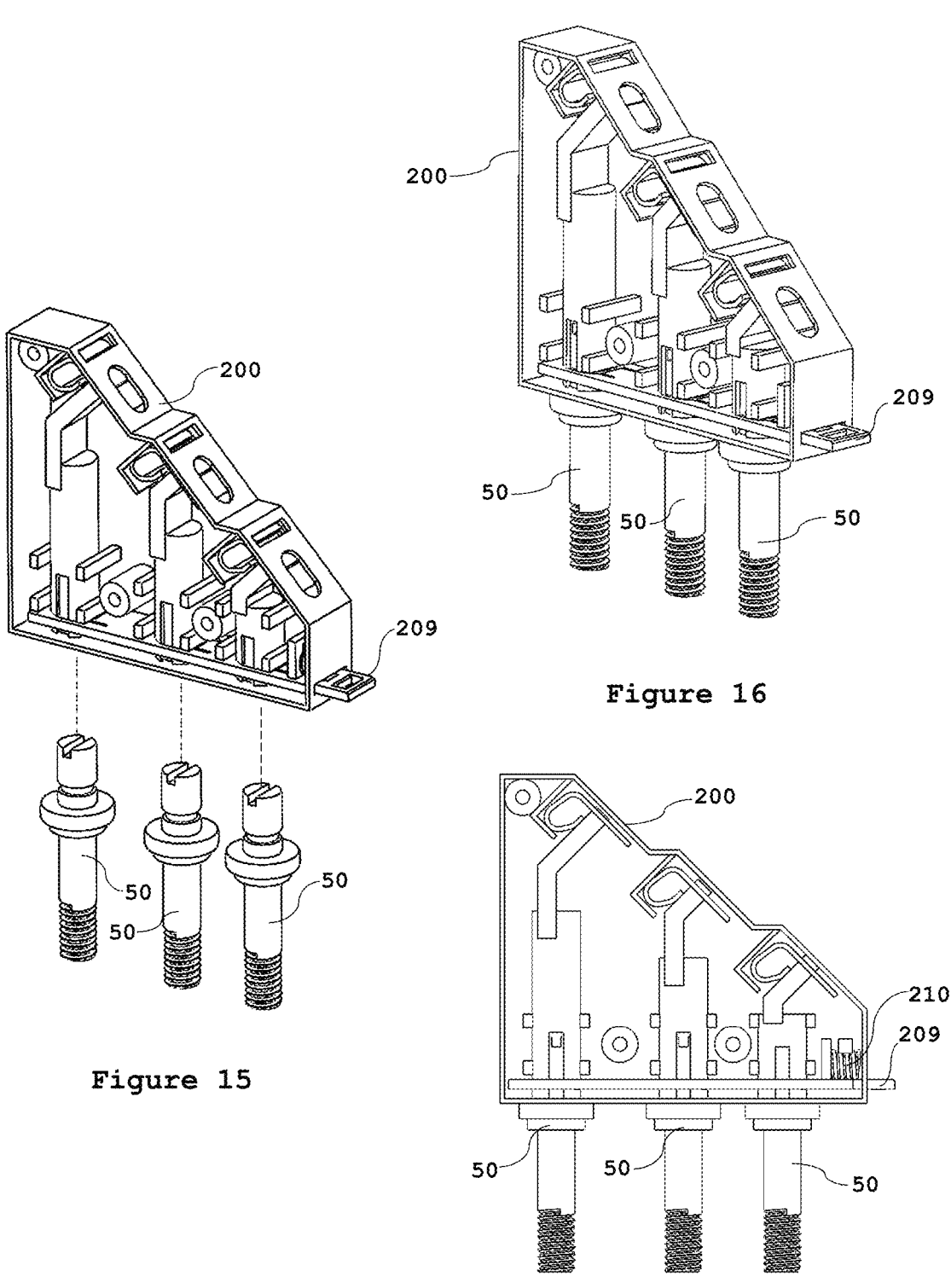
FIG. 15 shows installation terminal block, i.e., the electric element, suitable to be fastened to cylindrical head screws.
FIG. 16 depicts a perspective view of a installation terminal block, according to one or more embodiments of the present disclosure, when fastened.
FIG. 17 shows a side view of the same situation of the a installation terminal block of FIG. 16.
Figures 18, 19, 20:
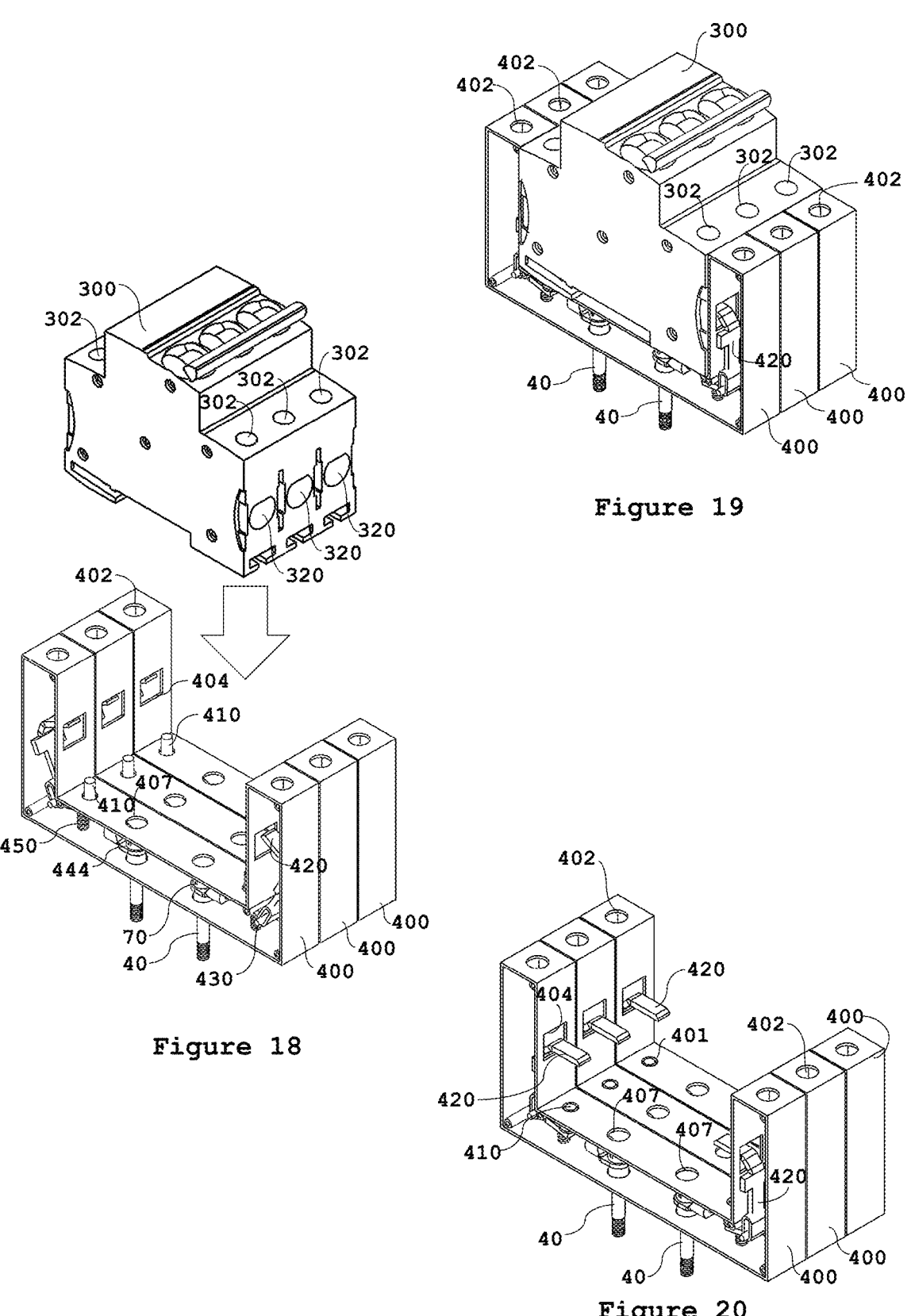
FIG. 18 depicts a $3^{rd}$ party electric element, i.e., circuit breaker and a corresponding socket, according to one or more embodiments of the present disclosure, in a position to receive the $3^{rd}$ party electric element.
FIG. 19 shows a perspective view of a situation when the $3^{rd}$ party electric element is inserted into the socket according to one or more embodiments of the present disclosure.
FIG. 20 shows a socket according to one or more embodiments of the present disclosure with its mechanism in a position once the $3^{rd}$ party electric element is inserted.

For connecting dedicated electric elements (200) to the laminated structure (100), other fastening variants can be equally used. In yet another variant, instead of using the threaded head screws (40) shown on the FIG. 12A, a cylindrical head screw (50), for instance, as depicted on the FIG. 12B, can used. According to one or more embodiments, a difference between the screws (40, 50) may be in their head formation. The cylindrical head screw (50), according to one or more embodiments of the present disclosure, can have the same features regarding the connection abilities within the laminated structure (100), as the threaded head screw (40) has. However, the way the cylindrical head screw (50) interacts with the elements (200) may be entirely different. The cylindrical head screw (50) can have a cylindrical head (54) equipped with the fastening grove (59). The fastening groove (59) can be designed to interact with the snap fastener (209) formed within the electric element (200), as for instance, depicted via set of FIGS. 15-17. The installation terminal block (200) can have a mechanism that is comprised of or consists of the snap fastener (209) powered with the spring mechanism (210), such as shown in FIG. 17. In one variant, the snap fastener (209) can be partially pulled out from the element (200) which can enable the cylindrical heads (54) of the corresponding cylindrical head screws (50) to protrude in the element (200). When the snap fastener is released, the spring can retract it back and the snap fastener (209) can lock cylindrical heads (54) to their fastening groves (59). In that manner the element (200), i.e., the installation terminal block (200) designed to cooperate with the kit or system, can be mechanically secured and electrically connected with the laminated electric circuit (100).

D. Non-Standard Electric Elements Connections

Regarding non-standard electric elements, fastening of specifically designed electric elements (200) via the threaded head screws (40) or via the cylindrical head screws (50), as explained in section C., can be regarded as a closed and only dedicated system, and for this system specifically designed, electric elements (200) can be compatible with the system. In practice, this can mean that the source of spare parts may be limited, and the system may not be versatile as should be. To overcome that difficulty, according to one or more embodiments of the present disclosure, a kind of universal socket (400) can be implemented, where the socket can interact with the laminated electric circuit (100) on one side, and can connect, as an interface, the standardised 3$^{rd}$ party electric elements (300) to the electric circuit (100), such as shown in FIGS. 18-24.

The way the socket (400) is connected to the laminated electric circuit (100) is depicted in FIGS. 21-24. A pair of threaded head screws (40) can be firstly mounted on the laminated electric circuit (100) as explained in the previous sections. Then, the pair of connecting screws (70) inserted through the holes (407) formed in the lower part of the socket (400) body—can fasten the socket (400) with the laminated electric circuit (100), both electrically and mechanically.

The socket (400) can have an electro-mechanical mechanism developed for receiving 3$^{rd}$ party electric element (300). For simplicity, in this description the variant with the U-shaped socket will be described. However, other socket (400) variants are possible, while are capable of carrying dedicated 3$^{rd}$ party electric elements (300).

The electro-mechanical mechanism can be composed from the pair of activating pins (410), element inserting levers (420), pins (430), contact parts (440), and springs (450). The situation before inserting the element (300) is depicted on FIGS. 22 and 24. The activating pins (410) can protrude out from the U-shaped socket (400) casing, through the pair of activating pin holes (401) in the interior of the said socket (400). Each activating pin (410) can be spring (450) driven, where the spring (450) can also press the corresponding element inserting lever (420) to be hidden within the U-shaped casing, such as shown in FIGS. 22 and 24. The element inserting lever (420) can be pivotally mounted to the pin (430), which can enable the rotation of the lever (420) from the position depicted on FIG. 24 to the position depicted on FIG. 23. Element inserting lever (420) can also be capable of protruding through the contact ejecting hole (404) in the socket (400) interior, such as shown in FIG. 22.

Inserting of the electric element (300) within the socket (400) can engage the activating pins (410) which can push springs (450) toward the bottom of the socket (400). This action rotates a pair of element inserting levers (420), fixed via pin receiving portions (423) over the corresponding pins (430), causing the element inserting levers (420) to protrude through ejecting holes (404). If the electric element (300) is inserted correctly into the socket (400), the element inserting levers (420) can enter the corresponding contact holes (320) of the electric element (300). Once the element inserting levers (420) are in the desired holes, the electrical contacts can be established via the standard electric element screws that can be accessed via the screw holes (302), for instance, positioned on the element (300) top, and which can fasten the levers (420) within the element (300). In that way, the element inserting levers (420) can be in the excellent electric contact with the 3$^{rd}$ party electric element (300). On the opposite side, i.e., within the socket (400), the element inserting levers (420) can be in the permanent elastic and electric contact with the corresponding contact parts (440). Namely, each elastic contact (444), as visible on FIG. 24, for instance, can be connected with its one side to the corresponding element inserting lever (420), and with its another side to the previously mentioned contact part (440). Each contact part (440) can be further fixed with the corresponding threaded head screw (40), using the connecting screw (70), for instance, and therefore with the laminated electric circuit (100), as well.

A pair of holes (402) can be formed over the top of the U-casing and can have double purpose. First can be to assist the pushing of the element inserting levers (420) toward the contact holes (320), if desired, during the insertion of the element (300). The second one can be that holes (402) can serve as the servicing holes in case of disassembly failures. Namely, over the years the springs (450) may weaken and discharging of the element (300) out of the socket (400) can cause non return of the element inserting levers (420) into the U-shaping casing. For that reason, the pair of holes (402) can help in such hypothetical malfunction of the electro-mechanical mechanism.

INDUSTRIAL APPLICABILITY

Embodiments of the present disclosure involve a kit or system, and method thereof, that can be used for automated assembling and/or disassembling of laminated electric circuits and the corresponding electric elements connected thereto, for instance, using industrial robots specifically designed for similar purposes. For that use, a high level of unification of the uses elements can be needed and embodiments of the present disclosure can implement such closed system, which can be still capable to integrate $3^{rd}$ party elements into, with a relatively high level of flexibility and reliability.

The invention claimed is:

1. A kit for automated assembling and/or disassembling of one or more laminated electric circuits each, upon assembly, being configured to have a corresponding one or more electric elements and/or a corresponding one or more third party electric elements respectively connected thereto, wherein each of the one or more laminated electric circuits is formed by two or more insulating sheets and a plurality of line conductors sandwiched between each of two adjacent insulating sheets of the two or more insulating sheets, wherein each of the one or more laminated electric circuits is to be mechanically tightly fastened once being formed, wherein each of the plurality of line conductors has at least one line equipped with a line connector having a contact bore, wherein the kit includes a plurality of kit elements, the plurality of kit elements including:

jumpers each having a jumper line, equipped with two or more jumper connectors, each of the two or more jumper connectors having a contact bore;

insert nuts each having a contact surface dimensioned to receive a line connector of a corresponding one of the plurality of line conductors or a corresponding one of the two or more jumper connectors of a corresponding one of the jumpers;

step bushings each dimensioned to receive the line connector of the corresponding one of the plurality of line conductors or the corresponding one of the two or more jumper connectors of the corresponding one of the jumpers, and having a contact surface and a bore;

bushings each having a bore, wherein each of the insert nuts, each of the step bushings, and each of the bushings has one or more rotation stoppers formed on an outer surface thereof for nesting and to prevent each of the insert nuts, each of the step bushings, and each of the bushings from rotating;

a plurality of connecting screws;

threaded head screws each having a thread formed in a head thereof configured to receive a connecting screw of the plurality of connecting screws;

cylinder head screws each having a cylindrical head with a fastening groove;

wherein each threaded head screw shank of the threaded head screws and each cylinder head screw shank of the cylinder head screws has a thread configured to fasten a corresponding one of the threaded head screws or a corresponding one of the cylinder head screws, respectively, into a corresponding one of the insert nuts, and with a length of each of the threaded head screw shanks and each of the cylinder head screw shanks dimensioned to receive one or more of the bushings and/or one or more of the step bushings between the corresponding one of the insert nuts and a head stopper of the corresponding one of the threaded head screws or of the corresponding one of the cylinder head screws;

screw plugs each having at least a partially threaded screw plug shank configured to fasten into the corresponding one of the insert nuts, and the at least the partially threaded screw plug shank is dimensioned to receive the one or more of the bushings or the one or more of the step bushings between the corresponding one of the insert nuts and a flat head of a corresponding one of the screw plugs; and the plurality of connecting screws each having at least a partially threaded connecting plug shank for screwing into the corresponding one of the threaded head screws; and one or more of sockets each with an electro-mechanical mechanism for insertion and/or ejection of the corresponding one of the one or more third party electric elements, wherein each of the one or more sockets is adapted to enable the corresponding one of the one or more third party electric elements to be in a locked mechanical position and in an electric contact with a corresponding one of the one or more laminated electric circuits via the threaded head screws configured to hold a corresponding one of the one or more sockets.

2. The kit according to claim 1, wherein each of the insert nuts is configured to form an electric contact with the line connector of the corresponding one of the plurality of line conductors or the corresponding one of the two or more jumper connectors of the corresponding one of the jumpers, and wherein a distance from the contact surface of each of the insert nuts to a top of a same one of the insert nuts is dimensioned according to a thickness of the line connector of the corresponding one of the plurality of line conductors or the corresponding one of the two or more jumper connectors of the corresponding one of the jumpers.

3. The kit according to claim 1, wherein each of the step bushings is configured to form an electric contact with the line connector of the corresponding one of the plurality of line conductors or the corresponding one of the two or more jumper connectors of the corresponding one of the jumpers, and wherein a distance from the contact surface of each of the step bushings to a top of a same one of step bushings is dimensioned according to a thickness of the line connector of the corresponding one of the plurality of line conductors or the corresponding one of the two or more jumper connectors of the corresponding one of the jumpers.

4. The kit according to claim 1, wherein the kit further comprises at least the plurality of line conductors.

5. The kit according claim 1, wherein each of the threaded head screws is equipped with a drive formed on a top of the head thereof to enable screwing and unscrewing into the corresponding one of the insert nuts.

6. The kit according to claim 1, wherein each of the cylinder head screws is equipped with a drive formed on a top of the cylindrical head thereof to enable screwing and unscrewing into the corresponding one of the insert nuts.

7. The kit according to claim 1, wherein each of the screw plugs is equipped with a drive formed in the flat head thereof to enable screwing and unscrewing into the corresponding one of the insert nuts.

8. A use of a system including the kit according to claim 1, wherein the system further includes:

at least the plurality of line conductors; and at least the two or more insulating sheets, and wherein the use of the system that includes the kit comprises automated or semi-automated assembling and/or disassembling of the one or more laminated electric circuits.

9. The use of the kit according to claim 8, wherein the automated assembling and/or disassembling of the one or more laminated electric circuits is performed via industrial robots.

* * * * *